United States Patent
Bergner et al.

(10) Patent No.: US 6,622,762 B2
(45) Date of Patent: Sep. 23, 2003

(54) ELECTRIC HAND TOOL WITH FUNCTION-ENHANCING ACCESSORIES

(75) Inventors: Joao Bergner, Aidlingen (DE); Uwe Engelfried, Ostfildern (DE); Martin Noack, Leinfelden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/130,523

(22) PCT Filed: Sep. 8, 2001

(86) PCT No.: PCT/DE01/03452

§ 371 (c)(1),
(2), (4) Date: May 20, 2002

(87) PCT Pub. No.: WO02/24404

PCT Pub. Date: Mar. 28, 2002

(65) Prior Publication Data

US 2003/0000599 A1 Jan. 2, 2003

(30) Foreign Application Priority Data

Sep. 21, 2000 (DE) .......................................... 100 46 815

(51) Int. Cl.[7] .............................. B27C 5/10; B27C 9/00
(52) U.S. Cl. .................. 144/48.6; 33/27.032; 33/27.04; 33/42; 144/136.95; 144/137; 144/154.5
(58) Field of Search ............................ 144/48.6, 134.1, 144/136.95, 154.5, 135.2, 371, 137, 252.1; 33/41.5, 42, 27.04, 27.032, 27.03; 409/180, 182

(56) References Cited

U.S. PATENT DOCUMENTS

| 4,044,805 | A | | 8/1977 | Gronholz | |
|---|---|---|---|---|---|
| 4,685,496 | A | | 8/1987 | Livick | |
| 5,117,879 | A | * | 6/1992 | Payne | 144/48.6 |
| 5,515,611 | A | * | 5/1996 | Maldonado | 144/48.6 |
| 5,662,440 | A | * | 9/1997 | Kikuchi et al. | 144/48.6 |
| 5,778,949 | A | * | 7/1998 | Draves | 144/48.6 |
| 5,983,968 | A | * | 11/1999 | Newman | 144/48.6 |

FOREIGN PATENT DOCUMENTS

| EP | 0 830 923 A1 | 3/1998 |
|---|---|---|
| FR | 2 618 362 A | 1/1989 |
| GB | 2 202 488 A | 9/1988 |

* cited by examiner

Primary Examiner—W. Donald Bray
(74) Attorney, Agent, or Firm—Michael J. Striker

(57) ABSTRACT

The invention relates to an electric hand tool (6) with an electric motor contained in a housing, which drives a chip-removing tool (8). The mounting section (14) of a mounting rail (1) is mounted in a detent locking fashion onto the mounting base (3) of the electric hand tool (6). A carriage-shaped component equipped with a compass point (12) is mounted onto this mounting rail (1) and/or a parallel fence (9, 10) can be adjustably positioned on it.

24 Claims, 8 Drawing Sheets

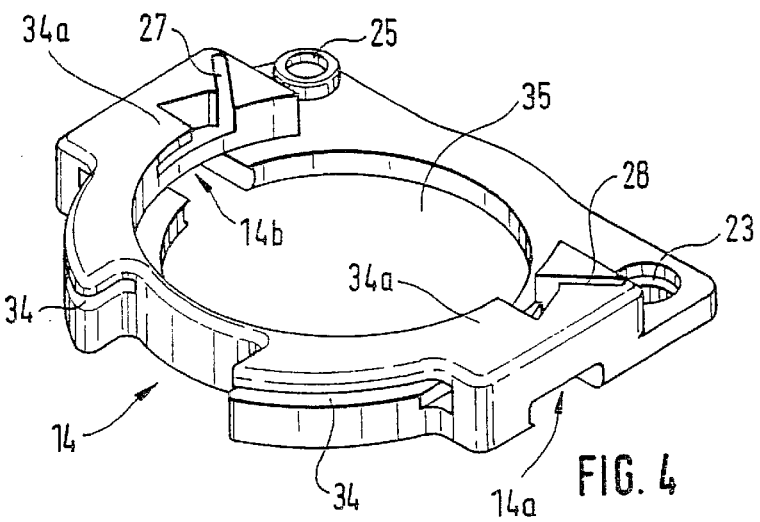
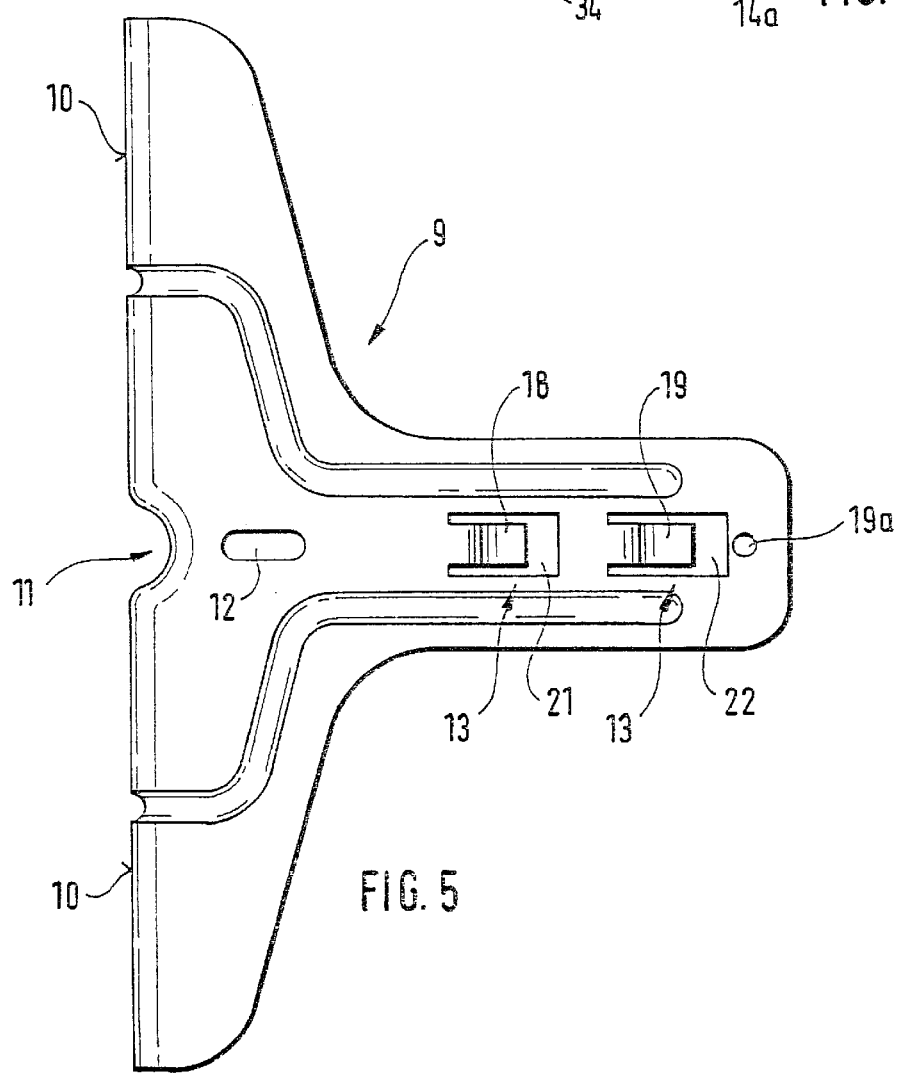

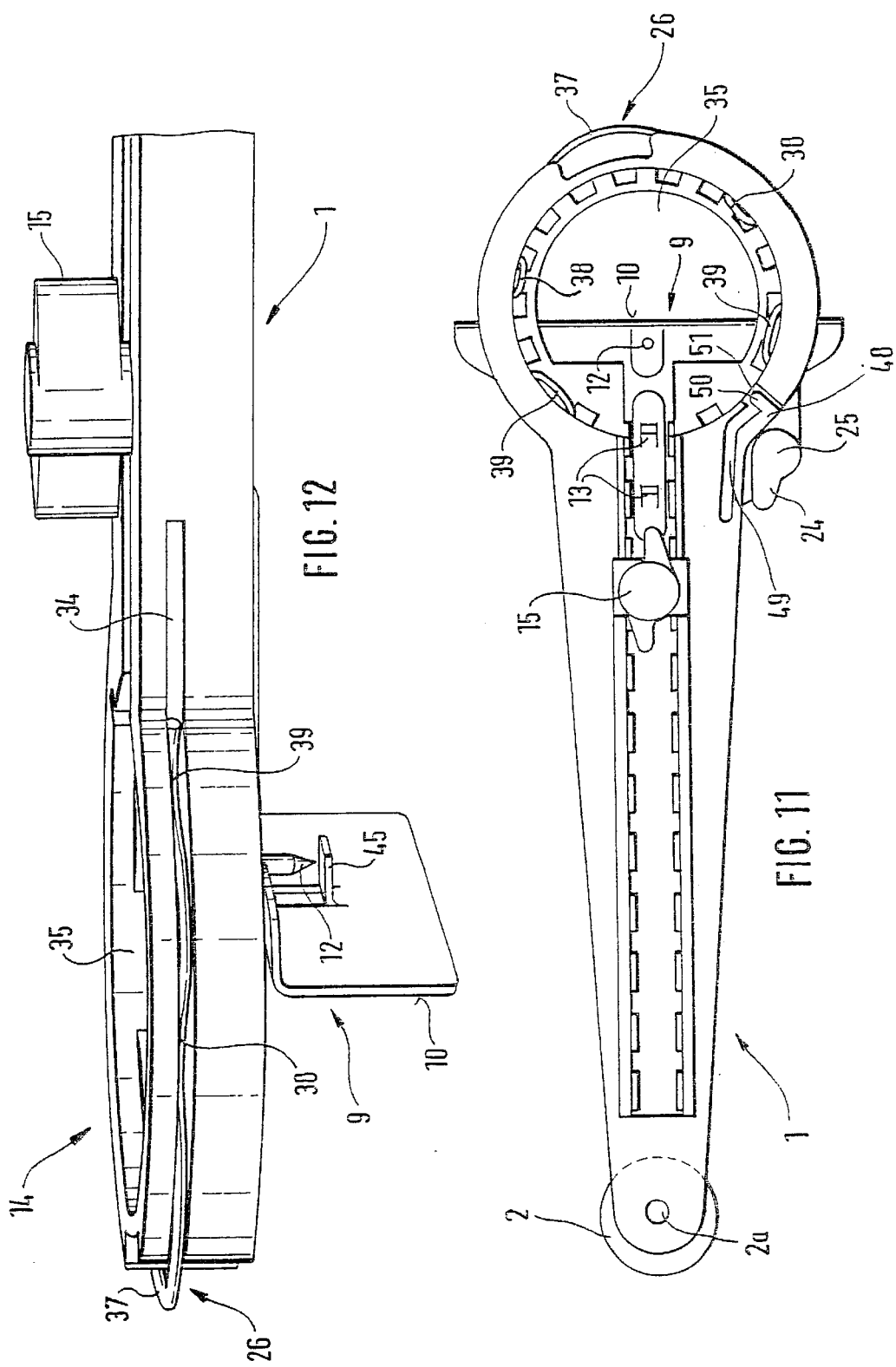

ELECTRIC HAND TOOL WITH FUNCTION-ENHANCING ACCESSORIES

TECHNICAL FIELD

Electric hand tools are usually equipped with an electric motor, which can drive a cutting or drilling tool, in general a chip-removing tool. In electric hand tools, which contain milling tools, it is desirable to increase its potential uses by means of attachments in order to open up a broader application spectrum to the electric tool user.

PRIOR ART

EP 0 830 923 A1 has disclosed an electrically driven hand tool. This includes a motor disposed in a housing, and a vertically adjustable milling head that is driven by the motor via a transmission. The disclosure of the device in EP 0 830 923 A1 proposes placing the electric motor of the hand tool in a horizontal position so that its drive shaft is disposed essentially perpendicular to the rotational axis of the milling head and a first adjusting device permits a manual, tool-free adjustment of the milling head in the vertical direction without changing the position of the motor and of the transmission. In addition, the known embodiment is provided with a second adjusting device, which permits a manual, tool-free lateral pivoting of the milling head.

This configuration of an electric hand tool known from the prior art is provided with two independently actuatable adjusting devices, one of which permits a vertical adjustment of the milling head, while the other adjusting device on the electric hand tool permits a lateral pivoting of the milling head. Since the second adjusting device extends essentially parallel to the drive shaft of the milling head, then there is no room to connect attachments such as parallel fences or circular stops next to the opening that encompasses the milling tool. This is essentially due to the orientation of the second adjusting device in the hand tool known from EP 0 830 923 A1 so that connecting and reliably securing attachments to this hand tool, which expand its potential uses, is hardly possible or can only be achieved for an increased cost.

SUMMARY OF THE INVENTION

Numerous advantages for operator using the electric hand tool, which is improved according to the invention, can be inferred from the embodiment proposed according to the invention. The function of an electric hand tool with an electric drive unit can be expanded in a multi-faceted way simply through the detent locking the mounting section of a mounting rail.

On the mounting rail itself, which can be comprised of U-shaped profiles that are slid into each other and are made of a metallic material or also of plastic, a compass point is provided on a carriage-shaped component and locking mechanisms are provided for the installation of a parallel fence. The parallel fence, which can be comprised of metal or shock-resistant plastic, can be fixed in its respective operating position on the mounting rail by means of a half turn or a three-quarter turn of a locking screw. The guide surface of the parallel fence is interrupted approximately in the middle by a recess, which in semicircular fashion, encompasses the chip-removing tool held in the chuck of the electric hand tool, regardless of whether it is a milling head, a drill bit, or a cutting tool.

With the compass point, which can be slid in relation to the mounting rail in a carriage-shaped component on the mounting rail, circular cutouts can be made in a wide variety of materials. Extremely small diameters of down to approx. 20 mm can be produced with precision due to the proximity of the compass point to the cutting tool mounted in the symmetry axis of the electric tool. The guidance of the electric hand tool around the inserted compass point when cutting out circles is facilitated by means of a turning handle mounted onto the end remote from the compass point. An adjustment of the radius' of the circle to be cut out can be simply executed by loosening the locking screw on the mounting rail and then sliding the two U-shaped profiles of the mounting rail in relation to each other. When cutting out circles, depending on the reduction of the movable points of intersection, a stable introduction of force is permitted, which permits precise operation to be executed. Only the mounting section of the mounting rail is detent connected to the mounting base of the electric hand tool and is therefore locked in the operating position. After a relative sliding of the U-shaped profiles of the mounting rail and adjustment of the cutting radius', all of the possible relative movements have been exhausted, thus assuring a virtually play-free disposition of the components in relation to one another.

One of the U-shaped profiles of the mounting rail, preferably comprised of a metallic material, is cast into the mounting section comprised of plastic. A compass point, preferably provided on a carriage-shaped component, can be disposed on one of the U-shaped profiles of the mounting rail; the parallel fence can be inserted into the relevant U-shaped profile to which the carriage-shaped component with the compass point mounted on it can be attached and, after a half turn or three-quarters turn of the locking screw, can be fixed to a clamping rail embodied in the U-shaped profile.

The mounting section of the mounting rail is fixed in position by means of a wire clip with rotation prevention means, which is inserted into the mounting section. For this purpose, the ends of the multiply deformed wire clip are inserted into mounting bores of the mounting section. When enclosing the mounting base of an electric hand tool, the multiply deformed sections, i.e. the detent projections of the shaped clip, engage in a recess of the mounting base of the electric hand tool at several locations. By exerting tension on a clamping yoke by means of a cam lever, the mounting section of the mounting rail can be simply and rapidly locked in a tool-free manner to the mounting base of the electric hand tool.

The embodiment proposed according to the invention of a mounting section, which can be coupled in a tool-free manner to the mounting base of an electric hand tool and is for function-expanding attachments such as parallel fences and compass point cuts, is distinguished by means of its extremely simple operation. An easily accessible clamping yoke device makes it possible in particular to fix the mounting section and the mounting base to each other in a non-rotatable fashion in a first operating position. In another, second operating position, the mounting section is secured in the axial direction by a shaped clip that can be inserted, but is held so that it can rotate freely in relation to the mounting base, which is very useful for producing circular cutouts in a work piece.

A mounting rail protruding radially from the mounting section can, in order to increase the operational safety, be secured at opposite points—e.g. in the form of recesses—in an annular wall of the mounting section, which assures a particularly safe operation. Openings that are oval or extend in the longitudinal direction of the mounting rail allow the operator to see the work piece and the cut being made in it.

The end of the mounting section oriented toward the mounting base of the electric hand tool can be provided with support surfaces, which absorb the forces of pressure exerted by the tool operator, which permits the achievement of a uniform introduction of force into the mounting section. A parallel fence can be mounted to a mounting section with mounting rails with particular ease due to the fact that the parallel fence is secured to a carriage, which can travel on the mounting rail, by means of detent locking mechanisms whose position in detent openings is assured by means of a frictional/positive engagement between the detent locking elements, which can be embodied as detent knobs that a detent surface can slide past.

BRIEF DESCRIPTION OF THE DRAWINGS

The invention will be explained in detail below in conjunction with the drawings.

FIG. 4   shows the mounting section, shown without the mounting rail,
FIG. 5   shows the embodiment of a parallel fence with a recess in the parallel fence guide surface,
FIG. 11  shows the locking being produced between the mounting section of a mounting rail and the mounting base of the electric hand tool at four locations,
and
FIG. 12  shows a shaped clip in the recess of an alternatively configured mounting section, with an injury prevention device on the compass point.

FIG. 1 shows the bottom view of a mounting section of the mounting rail, with a parallel fence and a carriage-shaped component, which is supported on a profile of the mounting rail and is provided with a compass point.

In a view from below, FIG. 1 shows the details of a mounting section 14 of a mounting rail 1. In this embodiment, the mounting rail 1, which is preferably comprised of two U-shaped profiles that are comprised of metallic or shock-resistant plastic and can be moved in relation to each other, is cast into the mounting section 14, which is preferably made of plastic. A handle 2 is supported in rotary fashion at the end of the mounting rail 1. The reference numeral 5 in FIG. 1 indicates the chip-removing apparatus of an electric hand tool 6 that is not shown in detail here, which can carry off the chips removed by the chip-removing tool (see FIG. 6). In the bottom view, a parallel fence 9 is mounted to a carriage-shaped component 12, of which only the compass point 12 is visible in FIG. 1. The guide surface 10 of the parallel fence 9 extends essentially perpendicular to the span of the mounting rail 1 and has a recess 11 in the vicinity of the symmetry axis of the electric hand tool 6 (not shown here). The recess 11, essentially in the form of a semicircle, encompasses the chip-removing tool 8 held in the chuck of the electric hand tool 6. Locking mechanisms 13 are embodied on the parallel fence 9, which permit the parallel fence 9 to be detent locked to the carriage-shaped component 12 on one of the U-shaped profiles of the mounting rail 1. In the exemplary embodiment depicted, the locking elements 13 of the parallel fence 9 are embodied as detent tabs 18, 19 (see FIG. 2a).

Figure 1:
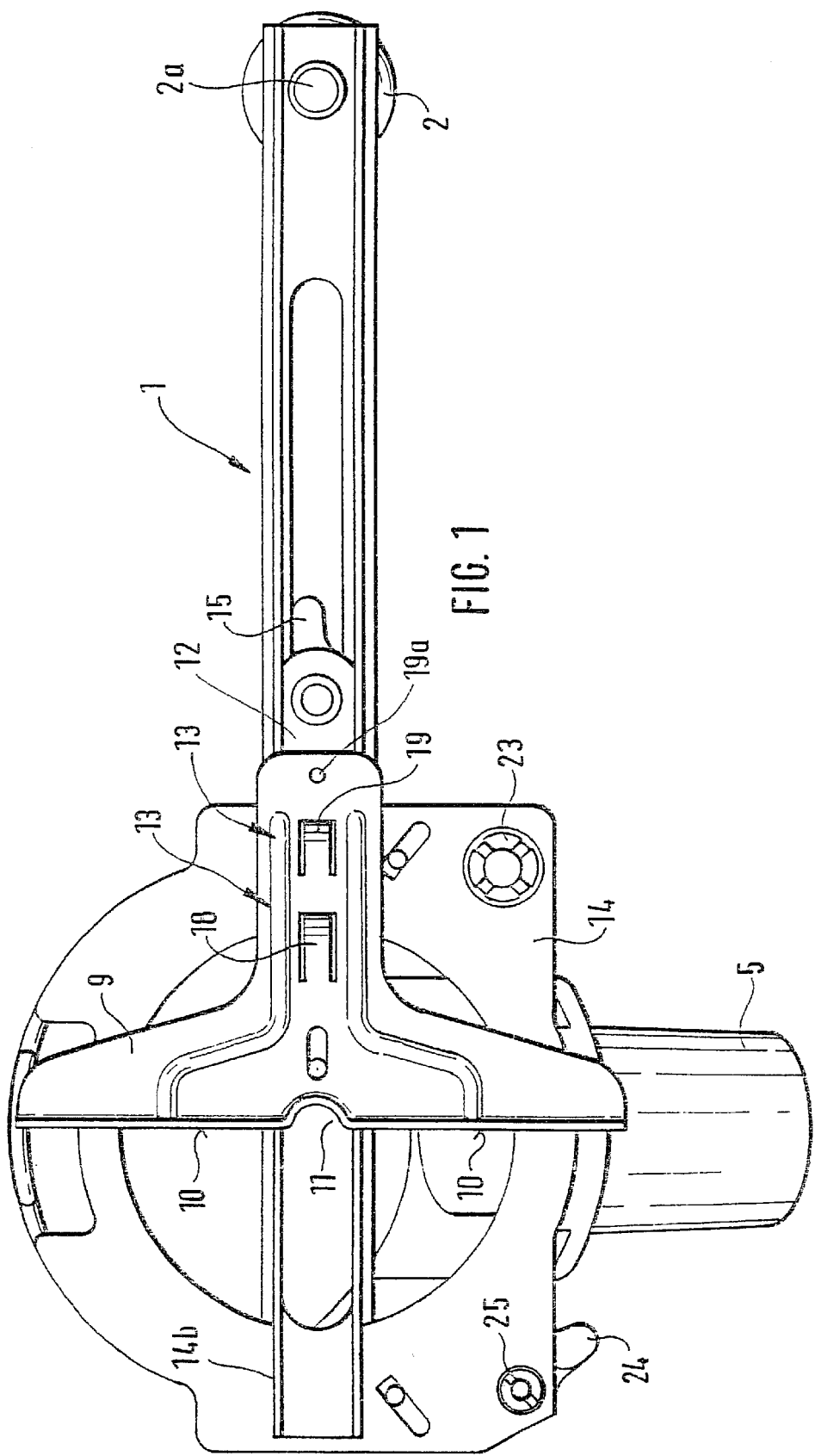
FIG. 1   is a bottom view of a mounting section of the mounting rail, with a parallel fence and compass carriage.

On the mounting section 14, which is preferably embodied as an injection-molded plastic component, a clamping yoke support is labeled with the reference numeral 23, while a cam lever 24 is supported in rotary fashion on a cam lever support 25. The cam lever 24 is used to clamp or release the clamping yoke, which is mounted in position 23 and is not shown in detail here.

Figures 2, 2A:
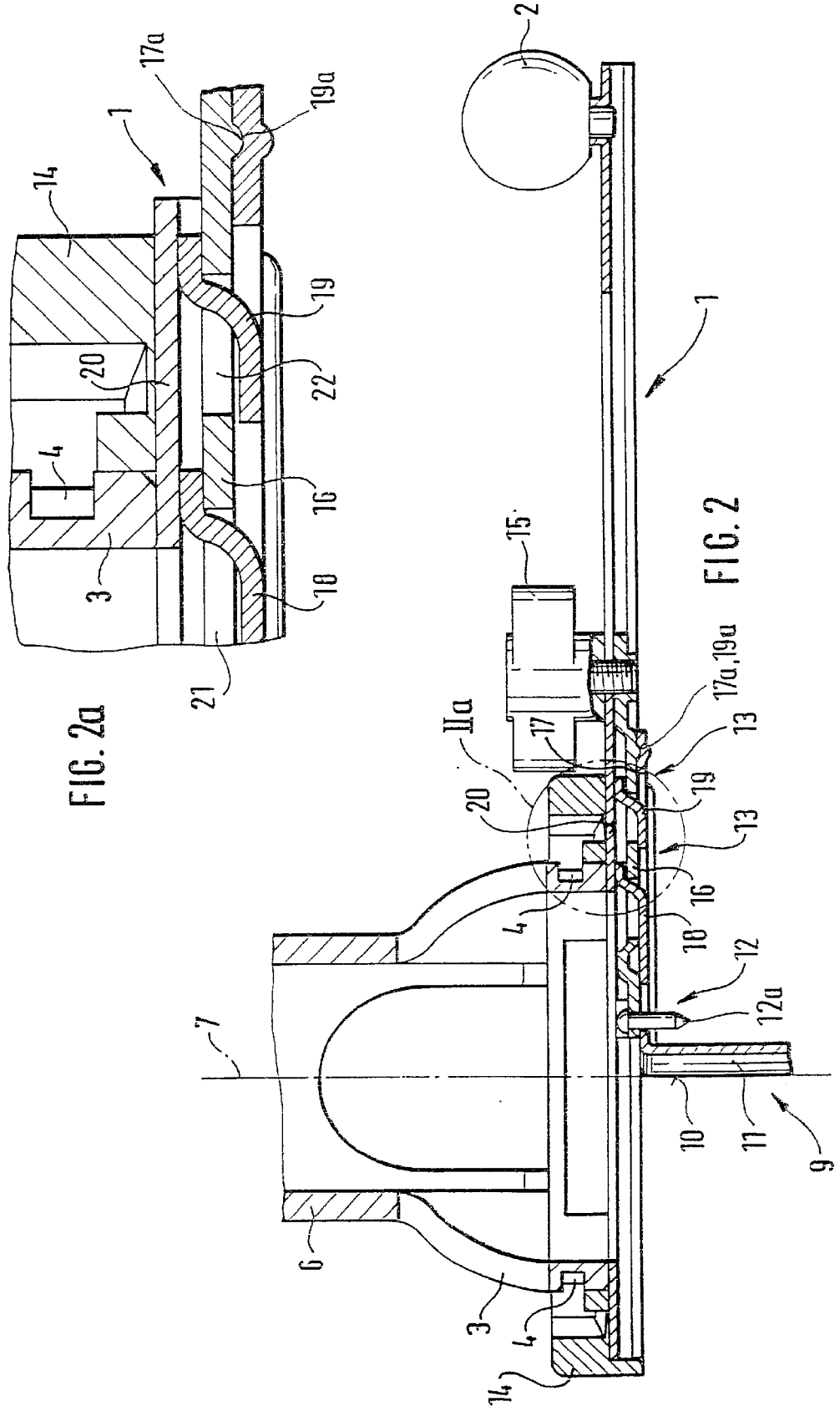
FIG. 2   is a side view of a mounting section that encompasses a mounting base of an electric hand tool according to FIG. 1.
FIG. 2a  shows the locking of the parallel fence to the carriage-shaped component with compass point and the clamping region on a U-shaped profile of the mounting rail.

FIG. 2 gives a detailed side view of the mounting section 14 encompassing a mounting base of an electric hand tool.

The reference numeral 6 indicates the schematically depicted electric hand tool, which includes an electric drive unit, which is disposed essentially coaxial to the symmetry axis 7 of the electric hand tool 6. The electric drive unit, which is not shown in detail here and is generally known, acts as a high-speed drive for a chip-removing tool such as a milling head, which is held in the chuck of the electric hand tool 6.

In the lower region of the electric hand tool 6, a mounting base 3 is shown, which has an annular recess 4 encompassing it. The recess 4 on the mounting base 3 of the electric hand tool 6 is encompassed by a mounting section 14 of the mounting rail 1, which is in turn provided with a circumferential recess.

A handle 2, which is supported in rotary fashion in a U-shaped profile of the mounting rail 1, is depicted at the end of the mounting rail 1. In addition, a locking screw 15 is provided on the mounting rail 1, whose thread cooperates with a carriage-shaped component on which a compass point is provided and which is mounted to a U-shaped profile of the mounting rail 1 and can be fixed in an operating position by moving the locking screw 15 on the relevant U-shaped profile. The parallel fence 9, whose guide surface 10 has a semicircular recess 11 let into it in the vicinity of the symmetry axis 7 of the electric hand tool 6, is disposed underneath the carriage-shaped component 12 in FIG. 2. The parallel fence 9, which can be detent locked by means of detent tabs 18 and 19 to the carriage-shaped component 12 on which the compass point is embodied, has an opening through which the compass point of the carriage-shaped component 12 protrudes. In order to receive the detent tabs 18 and 19 of the parallel fence 9, the carriage-shaped component 12 equipped with the compass point is provided with openings through which the respective detent tabs 18 and 19 of the parallel fence 9 reach and rest against a clamping surface 20 of a U-shaped profile of the mounting rail 1.

FIG. 2a is a more detailed representation of the locking of a parallel fence to a carriage-shaped component with a compass point and to the clamping surface of a U-shaped profile of the mounting rail.

The enlarged scale of FIG. 2a shows that the detent tabs 18 and 19, which are embodied on the parallel fence 9, protrude through openings 21 and 22 in the carriage-shaped component 12 and thereby reach above bridge parts 16 and 17 of the carriage-shaped component 12 and also rest underneath a clamping surface 20 of one of the U-shaped profiles of the mounting rail 1. The detent tabs 18 and 19 in the embodiment according to FIG. 2a are particularly easy to manufacture from a production engineering standpoint by means of being stamped. If the clamping screw 15 shown in FIG. 2 is actuated and thereby fixes the carriage-shaped component 12 in its position on the corresponding U-shaped profile of the mounting rail 1, the detent tabs 18 and 19 are clamped between the bridge parts 16 and 17 of the carriage-shaped component 12 and the clamping surface 20 on the relevant U-shaped profile of the mounting rail 1 so that turning the locking screw 15 on the one hand locks the carriage-shaped component 12 in place and on the other hand, clamps the parallel fence 9 to a U-shaped profile of the mounting rail 1. Above the clamping surface 20, FIG. 2a gives an enlarged scale depiction of the mounting base 3 of the electric hand tool 6 and the recess 4 embodied in it, which is encompassed by a mounting section 14 of the mounting rail 1, which section is also provided with a recess 34.

Figure 3A:
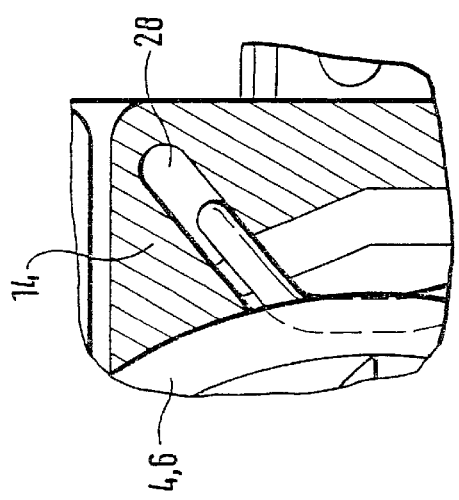
FIG. 3a  is a detail view of a shaped clip rotational locking device in the mounting section.
Figure 3:
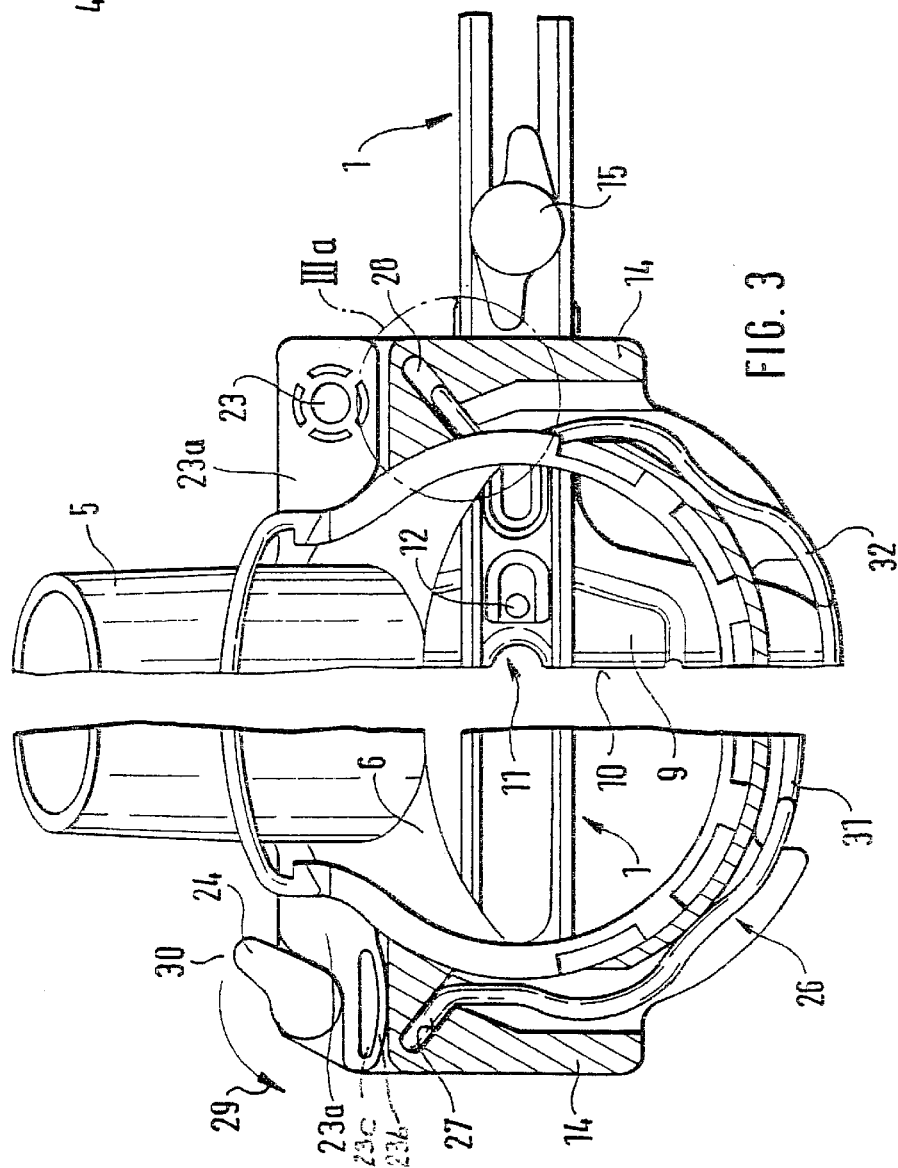
FIG. 3   is a top view of a partially sectional view of the mounting section of the mounting rail.

FIG. 3 shows a detailed top view of a partially sectional representation of a mounting section of the mounting rail.

The electric hand tool 6, which is only schematically depicted in this representation, is provided with a chip-removing apparatus 5 through which the removed chips are carried away from the electric hand tool 6. The mounting rail 1 is provided with the locking screw 15, which is mentioned above in connection with FIGS. 1 and 2 and can lock the two U-shaped profiles of the mounting rail 1 in a relative position in relation to each other.

The mounting section 14, which is shown in a sectional view in FIG. 3, contains a recess 34, which extends at least in a semicircle around the electric hand tool 6. A shaped clip 26 is inserted into this recess in the exemplary embodiment according to FIG. 3. The ends of the shaped clip 26 are inserted into bores 27 and 28 of the mounting section 14. In the left half of FIG. 3, the shaped clip 26 is shown in its open position 31, which can be recognized by the fact that the end of the respective shaped clip leg is completely inserted into the bore 27 in the mounting section 14. In the right part of FIG. 3, the shaped clip 26 is shown in its operating position 32. In the operating position 32, the end of the leg of the shaped clip 26 is partially retracted from the locking bore 28 and rests over only approximately half of its length against the side wall of the bore 28 of the mounting section 14. In the operating position 32, the tension required for the entry of the detent projections of the shaped clip 26 into the recess 4 of the mounting base 3 of the electric hand tool 6 is exerted by the tension section 37, as explained in more detail below.

In the upper region of the mounting section 14, the clamping yoke 23a is shown, which can be pivoted around a clamping yoke support 23 and can be actuated by means of a cam lever 24. In position 30, the cam lever is disposed in its open position and can be actuated counterclockwise into its closed position 29. In the closed position 29, the contact surface of the clamping yoke rests against the mounting section 14 and encompasses the mounting base 3 of electric hand tool 6 in a non-rotating fashion. In the closed position 29 of the clamping yoke 23a, the mounting section 1 is locked in a non-rotating fashion in a first operating position in relation to the mounting base 3. However, if the cam lever 24 is moved into its open position 30, in a second operating position of the clamping yoke 23a, the mounting section 14 can be rotated in relation to the mounting base 3, which is particularly useful for producing circular cutouts in work pieces. Independent of the first and second operating position of the clamping yoke 23a, the shaped clip 26 assures that the mounting section 14 and mounting base 3 are always fixed in the axial direction in relation to each other and that no relative movement between the mounting base 3 and mounting section 14 is possible, only a rotation of the mounting section 14 and the mounting base 13 in the first operating position of the clamping yoke 23a, i.e. the open position 30 of the cam lever 24.

FIG. 3 also shows that the U-shaped profile of the mounting rail 1 that is cast into the mounting section 14 passes through the opening 35 in the mounting section 14 and the parallel fence 9 with the guide surface 10 and the recess 11 contained in it is shown underneath the mounting rail 1. The semicircular recess 11 encompasses the chip-removing tool 8 (see FIG. 6) in an approximately semicircular fashion. The carriage-shaped component 12, which can be fixed in its longitudinal position on the mounting rail 1 by means of the locking screw 15, is shown with the compass point, which passes through the parallel fence 9 disposed beneath it, in the vicinity of a longitudinal bore.

FIG. 3a shows a detailed view of a shaped clip rotation prevention means in the mounting section 14 of the mounting rail. In this depiction, the shaped clip 26, of which the end of one leg is shown in a locking bore 28 here, is disposed in its operating position 32 according to FIG. 3. In its operating position, the shaped clip 26, which is formed into detent projections at several locations, engages in the recess 4 of the mounting base 3 of the electric hand tool 6. In the clamped position 32 of the shaped clip 26, the wall of the locking bore 28 is used as a support for absorbing the forces generated in the clip when it is placed under tension.

Depending upon the degree of deformation of the shaped clip 26, its detent projections contact several points along the circumference of the recess 4 embodied in the mounting base 3 of the electric hand tool 6 and produce an axially secure fixing of the mounting section 14, with the mounting rail 1 mounted to it, in relation to the electric hand tool 6.

FIG. 4 gives a more detailed depiction of the mounting section—shown here without the mounting rail 1.

The mounting section 14 of a mounting rail 1 is preferably produced as an injection-molded component, where one of the U-shaped profiles of the mounting rail 1 is cast into this injection-molded component. Alternatively, it is also conceivable for the mounting section 14 and a U-shaped profile of the mounting rail 1 to be embodied as being of one piece with each other and made of shock-resistant plastic. The mounting section 14 shown in FIG. 4 has an opening 35 passing through it, which contains the mounting base 3 of the electric hand tool 6. The mounting section 14 is provided with a recess 34, which extends at least in a semicircle around the opening 35 for containing the electric hand tool 6 and the shaped clip 26 is mounted in this recess 34. In the perspective depiction according to FIG. 4, the ends of the shaped clip 26, which is inserted into the recess 34 of the mounting section 14, are contained in the locking bores 27 and 28. The shaped clip 26, which is inserted into the recess 34, axially secures the mounting base 3 of the electric hand tool to be contained in the opening 35 against falling out, which ensures a safe operation of the comprised of the electric hand tool 6 and mounting section 14 and possibly-connected function-expanding attachments. The mounting section 14, which is embodied as an injection-molded component made of shock-resistant plastic, is provided with a clamping yoke support labeled with the reference numeral 23, while opposite from this, a cam lever 24 is mounted in rotary fashion in the cam lever support 25. On the end face of the mounting section 14 oriented toward the mounting base 3 of the electric hand tool 6, end face support sections 34a can be provided, which extend in the mounting section, above the recess 34. The operating force exerted by the tool operator is introduced uniformly into the mounting section 14 in the end face support sections 34a.

FIG. 5 shows an embodiment of a parallel fence with a recess in the parallel guide surface.

The parallel fence 9, which can be made of lightweight metal such as aluminum or of shock-resistant plastic, has a guide surface 10 extending essentially perpendicular to the mounting rail 1. The guide surface 10 is provided with a semicircular recess 11 in the center, aligned with the symmetry axis 7 of the electric hand tool 6. This recess encompasses the chip-removing tool 8, which is held in the chuck of the electric hand tool 6. Detent tabs 18, 19 are embodied on the parallel fence 9 and are particularly easy to manufacture from a production engineering standpoint as stamped tabs. The detent tabs 18, 19 protrude convexly above the flat structure of the parallel fence 9 and are accommodated in bridge parts 16, 17 of a carriage-shaped component 12, reach over these bridge parts, and rest with their top sides against a clamping surface 20 of one of the U-shaped profiles of the mounting rail 1. The detent tabs 18, 19 make it particularly easy to suspend the parallel fence 9 between the bridge parts 16 and 17 of the carriage-like component 12 and the clamping surface 20 of the U-shaped profile of the mounting rail 1.

As can be inferred in particular from FIGS. 2 and 2a, a function-expanding attachment in the form of a parallel fence 9, 10 can be secured in its operating position on the mounting rail 1 by detent locking means 17a, 19a. The detent tabs 18, 19 embodied on the parallel fence 9, 10 engage in correspondingly configured detent openings 21, 22 in a carriage-like sliding piece 12. As a fixing mechanism and captive engagement mechanism, when the detent tabs 18, 19 are clipped into the detent openings 20, 21, the detent locking means 17a and 19a slide over each other, thus producing a frictional/positive captive engagement of the parallel fence 9, 10 on the clamping surface of the carriage-like component 12. In the depiction according to FIGS. 2 and 2a, the reference numeral 17a indicates a detent knob, which a correspondingly configured detent surface 19a is slid over and as a result, secures the parallel fence 9, 10 in captive fashion to the clamping surface 20 of the carriage-like component 12.

The parallel fence 9, whether it is a component made of metallic material or an injection-molded component made of shock-resistant plastic, has an elongated opening, which the compass point 12a protruding out from the carriage-like component 12 passes through.

Figure 6:
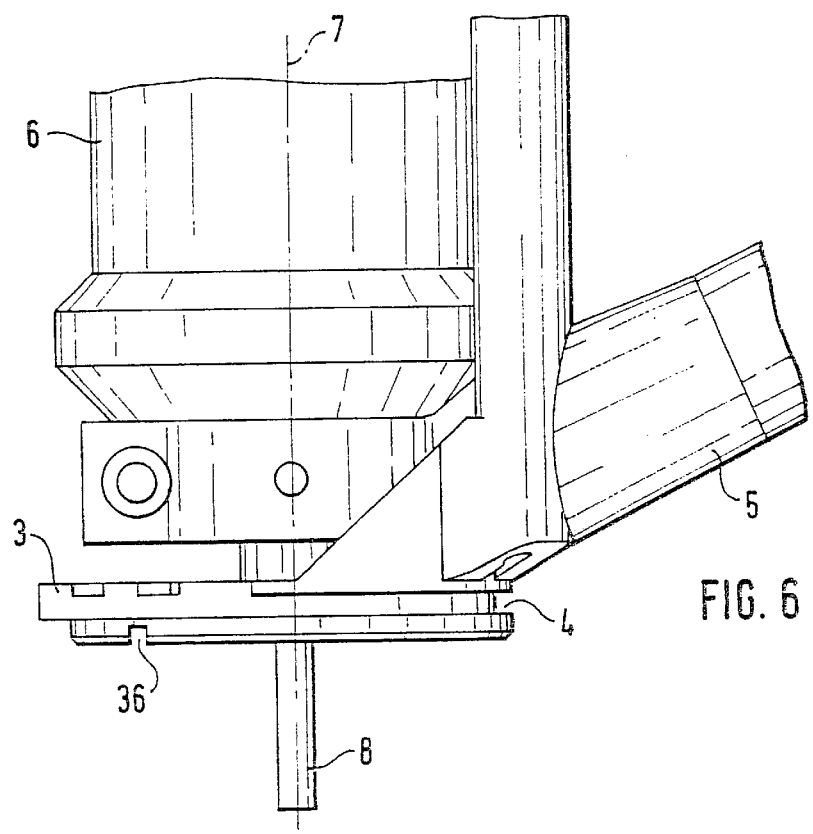
FIG. 6   shows the mounting base of an electric hand tool, with a recess for receiving a deformed wire clip of the mounting section.

FIG. 6 gives a detailed depiction of the mounting base of an electric hand tool 6, with an annular recess encompassing it to accommodate the insertion of a deformed shaped clip.

The electric hand tool 6, which is only schematically depicted here, has a symmetry axis 7 and a chip-removing tool 8 is mounted coaxial to this symmetry axis. The chip-removing tool 8 can be a milling head, a drill bit, or some other kind of cutting tool. An annular recess 4 encompasses the mounting base 3 of the electric hand tool 6; a centering mechanism 36 is also embodied on the mounting base 3 of the electric hand tool 6. A chip-removing apparatus 5 is provided on the side of the electric hand tool 6 and carries chips away from the operating region of the chip-removing tool 8, which chips are removed from the material 9 to be machined by the chip-removing tool 8, which rotates around the symmetry axis 7.

In a preferred embodiment of the electric hand tool 6, the hand tool is designed so that the electric drive unit, which drives the chip-removing tool 8, is mounted coaxial to the symmetry line 7 of the electric hand tool 6. This permits the mounting base 3 of the electric hand tool 6 to be embodied in a preferable manner as an annularly configured region.

Figure 7:
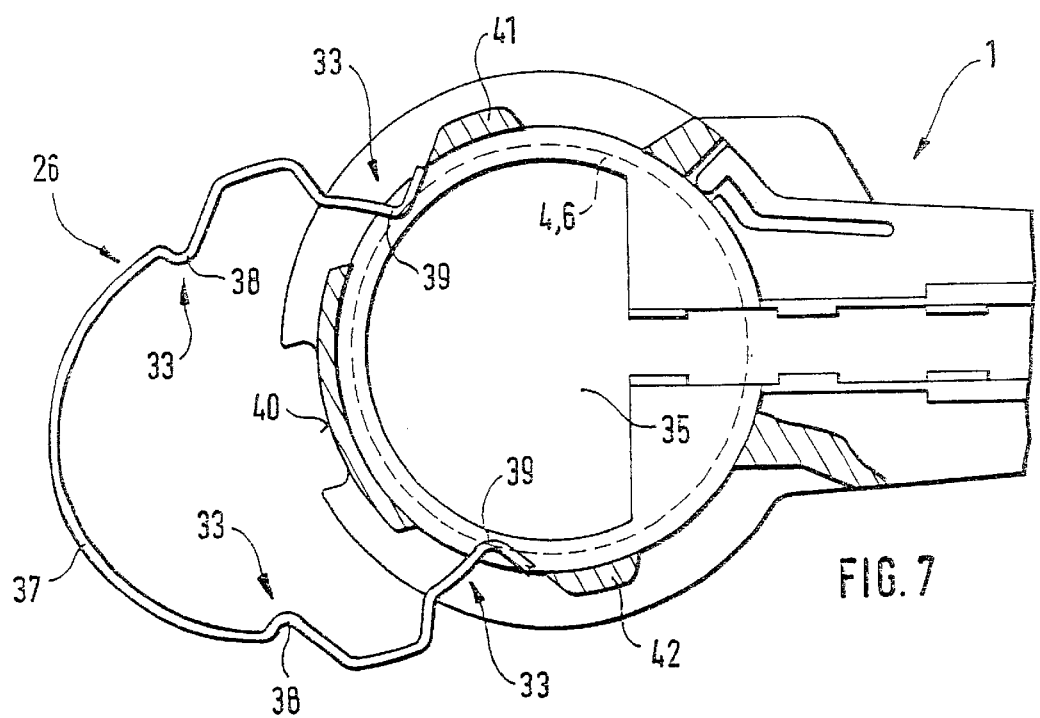
FIG. 7   shows the insertion of a multiply deformed wire clip into the recesses of a mounting section.

FIG. 7 shows in detail the insertion of a multiply deformed shaped clip 26 into the recess of a mounting section 14.

FIG. 7 shows the alternative embodiment of a mounting rail 1, in which the mounting section 14 and the mounting rail 1 are embodied as a one-piece injection-molded component. Also in this embodiment, the electric hand tool 6 to be detent connected to the mounting section 14 is provided with a recess 4 in the vicinity of its mounting base 3. In the vicinity of the mounting base 3, the recess 4 of the electric hand tool 6 is penetrated at several points by a shaped clip 26 in its operating position, thus producing a positive and frictional engagement between the shaped clip 26, the mounting section 14, and the recess 4 of the mounting base 3 of the electric hand tool 6.

The shaped clip 26 extends at least in a semicircle around the opening 35 of the mounting section 14, in which the mounting base 3 of the electric hand tool 6 is mounted. The wire clip 26 shown in FIG. 7 is a unidimensional component, which is particularly easy to manufacture from a production engineering standpoint in the form of a wire clip and includes an approximately semicircular tension section 37. The two legs extending out from the tension section 37 are each provided with a first detent projection 38 and a second detent projection 39 disposed after the first. These detent projections 38 and 39 are also embodied in both legs of the unidimensional shaped clip 26. The ends of the legs of the shaped clip 26 end in curved regions, which in turn are anchored in a non-rotating fashion in the locking bores 27, 28 in accordance with the mounting sections 14 that have already been explained above. The mounting section 14 shown in FIG. 7 has stop faces 40 for the shaped clip 26 and shaped projections 41, 42, which receive the shaped clip 26 that is deformed at multiple points.

Figure 8:
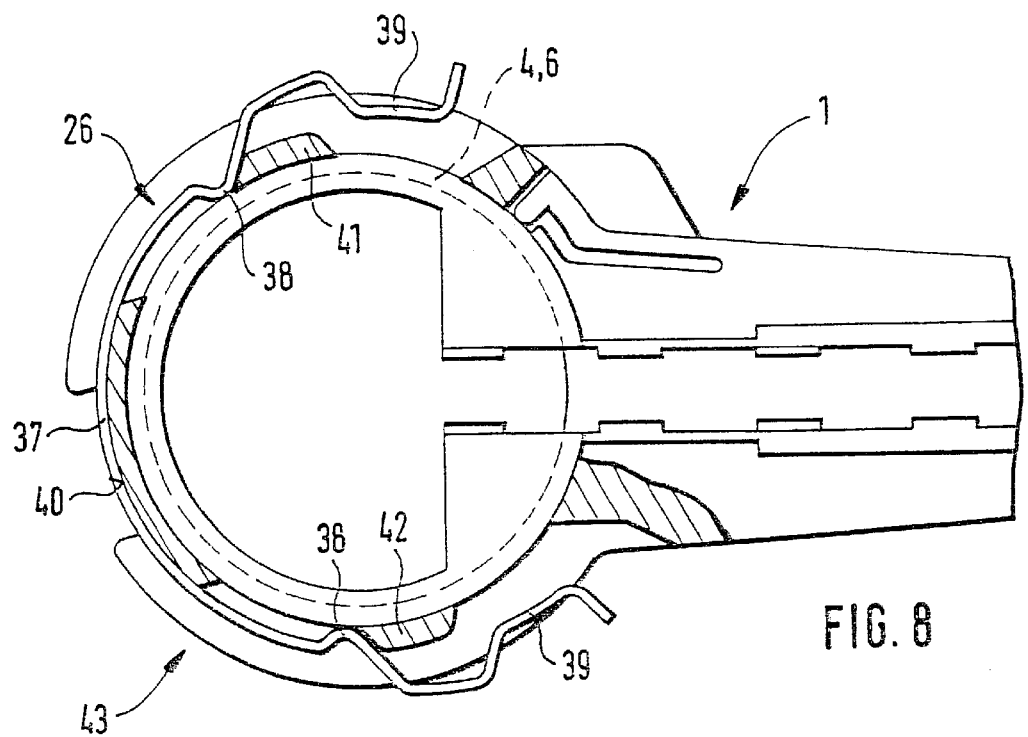
FIG. 8   shows the shaped clip inserted, its clamping region contacting a surface, but its shaped clip ends extending freely.

FIG. 8 shows a shaped chip, which is brought into contact with the stop face 40 of the mounting section 14, where in the state shown in FIG. 8, locking bores of the mounting section 14 do not encompass the ends of the freely extending legs of the shaped clip.

In its open position shown in FIG. 8, the shaped clip 26 rests with its tension section 37 against the stop face 40 of the mounting section 14. The detent projections 41, 42 of the mounting section 14 constitute stop faces for the first pair of opposing detent projections 38 of the two legs of the shaped clip 26. In the exemplary embodiment shown in FIG. 8, the detent projections 39 of the two legs of the shaped clip 26 have not yet assumed their position in which they engage in the recess 4 of the electric hand tool 6, since the outward-extending ends of the two legs of the shaped clip 6 have not yet engaged in detent fashion in the locking bores 27, 28 of the mounting section 14. In the depiction according to FIG. 8, the mounting rail 1 and the mounting section 14 are also embodied as a one-piece component, which can, for example, be produced as an injection-molded component made of shock-resistant plastic.

Figure 9:
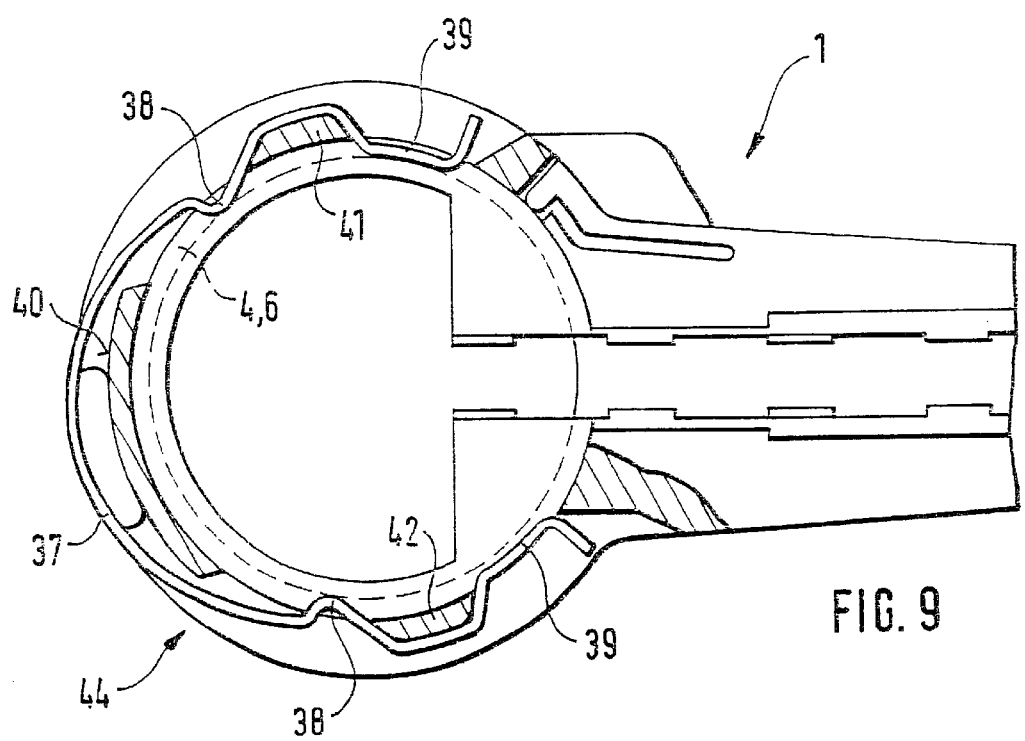
FIG. 9   shows the engagement of the detent projection of the shaped clip in the recess of the mounting base of the electric hand tool, with the shaped clip ends fixed in the mounting section.

FIG. 9 shows the engagement of the detent projections of the shaped clip in the recess of the mounting base the 3 of the electric hand tool 6 when the shaped clip ends are fixed in place in the mounting section 14.

FIG. 9 shows that when the unidimensional shaped clip 26 engages in detent fashion in the recess 4 of the electric hand tool 6 and when the outward-extending leg ends are received in the locking bores 27, 28 of the mounting section 14, the tension section 37 of the shaped clip 26 lifts up from the stop face 40. This causes the detent projections 38, 39 of the two legs of the shaped clip 26 to move into the recess 4 of the mounting base 3 of the electric hand tool 6. In the depiction shown in FIG. 9, the detent projections 38, 39 engage in the recess 4 of electric hand tool 6 and produce a positive engagement with it. In this state, the shaped clip 26 assumes its operating position 44, which secures the mounting section 14 and mounting base 3 of the electric hand tool 6 axially in relation to each other. Depending on the position of the cam lever 24, whether in its closed position 29 or in its open position 30 and therefore the effective position of the clamping yoke 23a, the mounting section 14 and the mounting base 3 can be brought into a first operating position or a second operating position in relation to each other, permitting the operation of an electric hand tool 6 configured in this manner to begin.

Figure 10:
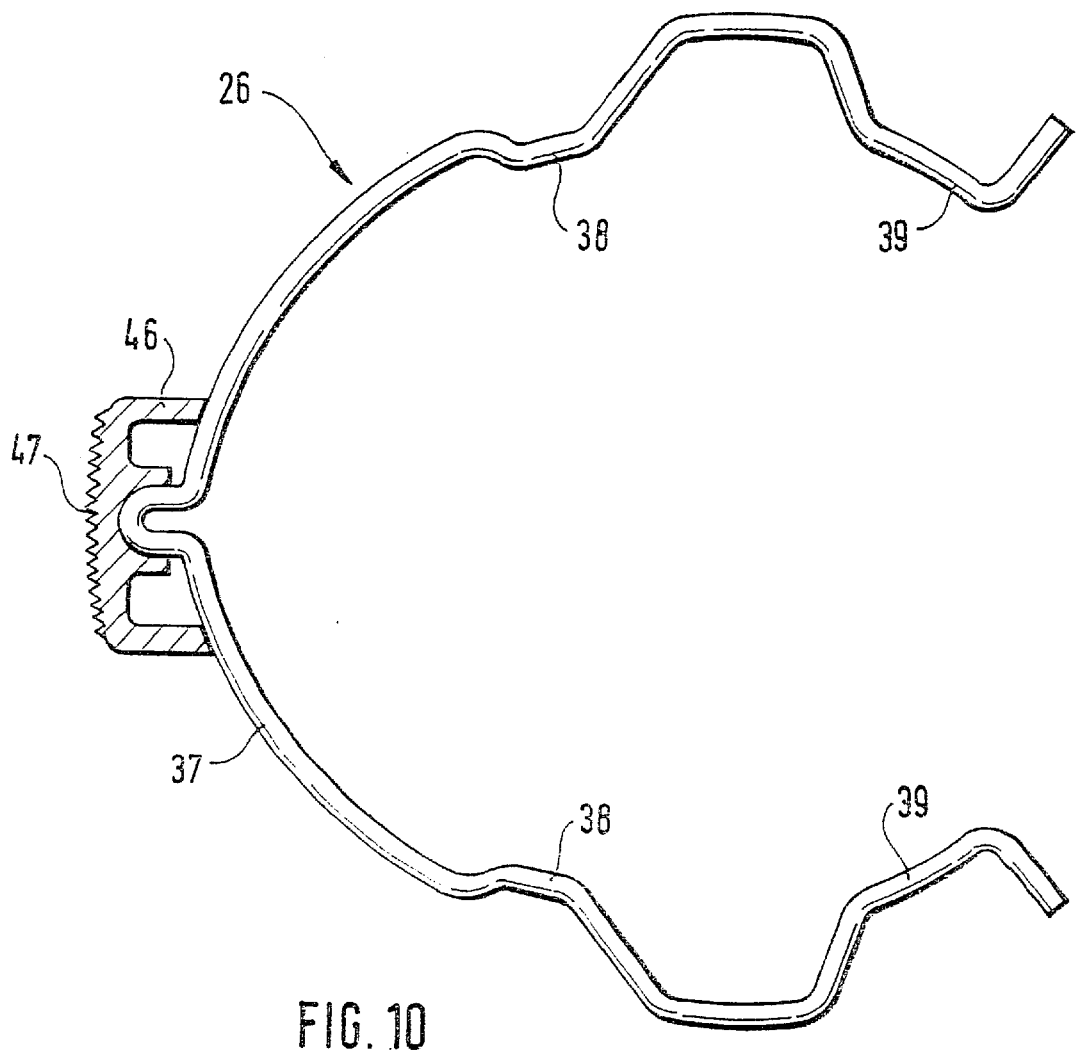
FIG. 10  is a view of an embodiment of a multiply deformed shaped clip, with an actuating knob provided on the side.

FIG. 10 gives a detailed view of an embodiment of a multiply deformed shaped clip with the actuating knob provided on the side.

The shaped clip 26 according to FIG. 10 is embodied as a springy component, which is essentially embodied as a unidimensional bent wire part. This permits the shaped clip 26 to be produced very easily; it also permits the production of a symmetrical embodiment and keeps production costs low. In FIG. 10, the two outward-extending legs of the shaped clip 26 are provided with a first pair of detent projections 38 and a second pair of detent projections 39. The two outward-extending legs of the shaped clip 26 adjoin the tension section 37. In one embodiment of the shaped clip 26, an actuating knob 46 is provided in the tension section 37 and can be equipped, for example, with a ridged surface 47. This ridged surface 47 permits the tension section 26 to be slid toward the recess 4, 34 so that the detent projection pairs 38, 39 in the recess 4 of the mounting base 3 of the electric hand tool 6 come into contact with a their corresponding detent engagement points.

FIG. 11 gives a detailed depiction of the locking of the mounting section of a mounting rail to the mounting base of an electric hand tool.

FIG. 11 shows an embodiment of the mounting rail 1, which, together with the mounting section 14, can be embodied as a one-piece injection-molded component. The mounting rail 1 is provided with a bore 2a for containing a screw bolt of a rotatable handle 2, which is disposed beneath the mounting rail 1 in FIG. 11.

In addition, the region of the mounting rail 1 oriented toward the mounting section 14 is provided with a locking screw 15 that can fix the two U-shaped profiles of the mounting rail 1, which can be slid in relation to each other, in different operating positions in relation to each other. The reference numeral 13 indicates the respective locking mechanisms of a carriage-like component 12, which has a compass point mounted on it. In a preferred embodiment, the locking mechanisms for the parallel fence are embodied as detent tabs 18, 19, which can be manufactured with particular ease by being stamped out of sheet metal.

The mounting section 14, which in the depiction according to FIG. 11 is produced of one piece with the mounting rail 1 shown there, has a shaped clip 26 inserted into it, whose tension section 37 protrudes beyond the circumference of the mounting section 14. At the points indicated by the reference numerals 38 and 39, the legs of the shaped clip 26 engage in the recess 4 of a mounting base 3 of the electric hand tool 6, which mounting base 3 is embodied in the opening 35 of the mounting section 14 to receive the electric hand tool 6. The guide surface 10 of a parallel fence 9 is schematically depicted and this guide surface 10 can be detent connected to the carriage-shaped component 12 that has the compass point by means of the locking devices for the parallel fence, which are indicated at position 13.

The depiction according to FIG. 11 also shows that the mounting section 14 according to FIG. 11 is provided with a cam lever 24, which can be pivoted around a cam lever support 25. By means of the cam lever 24, a clamping yoke of the mounting section 14 can be moved from an open position into a closed position and vice versa so that the mounting section 14 can be clamped to the mounting base 3 of the electric hand tool 6 to be mounted in the opening 35. An embodiment for producing a clamping action between a mounting base 3 and a mounting section 14 that is configured in one piece, with a mounting rail 1 injection-molded onto it can also be inferred from the depiction according to FIG. 11. A cam lever 24, which can be moved around an axis 25 and acts on a clamping jaw 48, can press the clamping projection 50 embodied on the clamping jaw 48 through an opening 51 of the opening 35 and can lock a mounting base 3 in a non-rotating fashion in this opening 35. The cam lever 24 presses the clamping jaw 48 into a recess 49; the deflection of the clamping jaw 48 causes a clamping projection 50 embodied on the clamping jaw 48 to move into the circumference of the receiving opening 35 for receiving the mounting base 3 of the electric hand tool 6.

Finally, FIG. 12 shows a shaped clip, which is inserted into a recess of an alternatively configured one-piece mounting rail/mounting section apparatus. The tension section 37 of the shaped clip 26 protrudes beyond the circumference of the mounting section 14. The detent projections 38, 39 embodied on the legs of the shaped clip 26 protrude into the boundary of the opening 35 intended to receive an electric hand tool 6 and consequently into the recess 4 of the mounting base 3 of an electric hand tool 6 to be fixed in the opening 35, which recess 4 is also embodied in a circumferential shape. The reference numeral 15 indicates a locking screw on the mounting rail 1, which when given a half turn or three-quarter turn can lock the two U-shaped profiles of the mounting rail 1 in particular operating positions in relation to each other.

A parallel fence 9 is shown underneath the mounting section 14 and can be detent connected in the above-describe manner to a carriage-like component 12, which has a compass point mounted on it. The depiction according to FIG. 12 shows that a pivotable protective cap 45 encompasses the compass point of the carriage-like component so that the user is protected from being injured by the sharp compass point on the carriage-like component 12. In the depiction according to FIG. 12, the mounting rail 1 and mounting section 14 are produced as a one-piece injection-molded component; the mounting section 14 has a recess 34 at least in the form of a semicircle let into it to permit the insertion of the shaped clip 26, which is preferably produced as a unidimensional bent wire part.

REFERENCE NUMERAL LIST

| | |
|---|---|
| 1 | mounting rail |
| 2 | turning handle |
| 2a | bore |
| 3 | mounting base |
| 4 | recess |
| 5 | chip-removing apparatus |
| 6 | electric hand tool |
| 7 | electric hand tool symmetry axis |
| 8 | chip-removing tool |
| 9 | parallel fence |
| 10 | guide surface |
| 11 | recess for chip-removing tool |
| 12 | compass point carriage |
| 12a | compass point |
| 13 | parallel fence locking mechanism |
| 14 | mounting section |
| 14a | first recess |
| 14b | second recess |
| 15 | locking screw |
| 16 | bridge of carriage 12 |
| 17 | bridge of carriage 12 |
| 17a | detent knob |
| 18 | parallel fence detent tab |
| 19 | parallel fence detent tab |
| 19a | detent recess |
| 20 | mounting rail clamping surface |
| 21 | opening of carriage 12 |
| 22 | opening of carriage 12 |
| 23 | clamping yoke support |
| 23a | clamping yoke |
| 24 | cam lever |
| 25 | cam lever support |
| 26 | shaped clip |
| 27 | mounting section locking bore |
| 28 | mounting section locking bore |
| 29 | cam lever closed position |
| 30 | cam lever open position |
| 31 | shaped clip open position |
| 32 | shaped clip operating position |
| 33 | shaped clip deformed section |
| 34 | mounting section recess |
| 34a | support end face |
| 35 | opening for electric hand tool mounting base |
| 36 | centering mechanism |
| 37 | tension section |
| 38 | front detent projection |
| 39 | rear detent projection |
| 40 | tension section stop face |
| 41 | shaped projection |
| 42 | shaped projection |
| 43 | open position |
| 44 | operating position |
| 45 | protective cap for compass point |
| 46 | detent hook |
| 47 | ridged surface |
| 48 | clamping jaw |
| 49 | recess |
| 50 | clamping projection |
| 51 | opening |

What is claimed is:

1. An electric hand tool, comprising a housing; an electric motor arranged in said housing and driving a chip-removing tool drivable by said electric motor; a mounting base; a mounting section which is coupable to said mounting base without a tool and lockable in position in an axial direction; and function-expanding attachments which are adjustably positioned on said mounting section.

2. An electrical hand tool as defined in claim 1, wherein said mounting section is provided with a recess which extends at least in a semi-circle around an opening for said mounting base.

3. An electrical hand tool as defined in claim 2; and further comprising a uni-dimensional shaped clip inserted in said recess of said mounting section.

4. An electrical hand tool as defined in claim 2; and further comprising an end support face provided on an end face oriented toward said mounting base, above said mounting section.

5. An electrical hand tool as defined in claim 3, wherein said mounting section is provided with at least one locking bore for receiving ends of said shaped clip.

6. An electrical hand tool as defined in claim 3, wherein said shaped clip includes a semi-circular shaped section and detent projections provided on both legs of said shaped clip.

7. An electrical hand tool, comprising a housing, an electric motor accommodated in said housing and driving a chip-removing tool; a mounting base; a mounting section; and a clamping device mounted on said mounting section and bringing said mounting section into a first and a second operating position in relation to said mounting base.

8. An electrical hand tool as defined in claim 7; and further comprising a cam lever, said clamping device being formed as a clamping yoke which is actuatable by said cam lever.

9. An electrical hand tool as defined in claim 8, wherein said cam lever is movable between a closed position and an open position.

10. An electrical hand tool as defined in claim 9, wherein in said closed position of said cam lever said mounting section is locked in place in a non-rotating fashion in relation to said mounting base in a first operating position.

11. An electrical hand tool as defined in claim 9, wherein in said open position of said cam lever said mounting section is held so that it is freely rotatable in relation to said mounting base in a second operating position.

12. An electrical hand tool as defined in claim 7, wherein said mounting base is supported on end support faces about a recess of said mounting section.

13. An electrical hand tool, comprising a housing; an electric motor accommodated in said housing and driving a chip-removing tool; a mounting base; a mounting section provided with a radially protruding mounting rail which passes laterally through an opening in said mounting section for receiving said mounting base.

14. An electrical hand tool as defined in claim 13, wherein said mounting rail is fastened in recesses on opposite annular walls of said mounting section.

15. An electrical hand tool as defined in claim 13, wherein said mounting rail includes two profiles which are movable in relation to each other and fixable in relation to each other for various operating positions by a locking screw.

16. An electrical hand tool as defined in claim 15, wherein one of said profiles of said mounting rail is provided with a handle for guidance and is cast into said mounting section.

17. An electrical hand tool as defined in claim 13, wherein said mounting section and said mounting rail are formed as a one-piece injection-molded component.

18. An electrical hand tool as defined in claim 13, wherein said mounting rail has U-shaped profiles, one of said U-shaped profiles being provided with a clamping surface for fixing of attachments.

19. An electrical hand tool as defined in claim 18; and further comprising a compass point affixed to a carriage-shaped component which is movable parallel to said mounting rail on one of said U-shaped profiles.

20. An electrical hand tool as defined in claim 19, wherein said carriage-shaped component with said compass point is fixable in its operating position on said mounting rail by a locking screw.

21. An electrical hand tool as defined in claim 19, wherein said carriage-shaped component with said compass point is provided with detent openings permitting a parallel fence to be fixed in position.

22. An electrical hand tool as defined in claim 20, wherein detent tabs of said parallel fence reach through said detent openings on said carriage-shaped component with said compass point and rest against a clamping surface of said mounting rail when said locking screw is fastened.

23. An electrical hand tool as defined in claim 13, wherein said mounting rail has a profile which is cast into said mounting section and provided with a longitudinal opening for passage of the chip-removing tool.

24. An electrical hand tool as defined in claim 23; and further comprising detent locking means provided between said parallel fence and said carriage-shaped component, said detent tabs being clipped into said detent openings, and formed so that when said detent tabs are clipped in said detent openings, said detent locking means secure said parallel fence to said carriage-shaped component.

* * * * *